(12) United States Patent
Chen

(10) Patent No.: US 7,196,618 B2
(45) Date of Patent: Mar. 27, 2007

(54) TIRE PRESSURE MONITORING DEVICE

(75) Inventor: Andy Chen, Nan-Tou Hsien (TW)

(73) Assignee: Universal Scientific Industrial Co., Ltd., Nan-Tou Hsien (TW)

(*) Notice: Subject to any disclaimer, the term of this patent is extended or adjusted under 35 U.S.C. 154(b) by 164 days.

(21) Appl. No.: 11/050,834

(22) Filed: Feb. 7, 2005

(65) Prior Publication Data
US 2006/0077051 A1   Apr. 13, 2006

(30) Foreign Application Priority Data
Sep. 29, 2004 (TW) ............... 93215476 U

(51) Int. Cl.
  *B60C 23/00* (2006.01)
  *B60C 23/02* (2006.01)
(52) U.S. Cl. ............ 340/447; 340/442; 340/445; 73/146.4; 73/146.5
(58) Field of Classification Search ........ 340/442, 340/445, 447; 73/146.4, 146.5
See application file for complete search history.

(56) References Cited

U.S. PATENT DOCUMENTS

| | | | |
|---|---|---|---|
| 6,729,180 B2* | 5/2004 | Sanchez et al. | 73/146.3 |
| 6,977,615 B2* | 12/2005 | Brandwein, Jr. | 343/700 MS |
| 2005/0076992 A1* | 4/2005 | Metcalf et al. | 156/110.1 |
| 2006/0009251 A1* | 1/2006 | Noda et al. | 455/550.1 |

* cited by examiner

*Primary Examiner*—Julie Bichngoc Lieu
(74) *Attorney, Agent, or Firm*—Foley & Lardner LLP

(57) ABSTRACT

A tire pressure monitoring device includes a planar circuit board, a sensor, a controller, and an antenna. The sensor is mounted on the circuit board, is adapted for detecting a pressure of a pneumatic tire of a vehicle, and is operable so as to generate a signal that corresponds to the detected pressure of the pneumatic tire of the vehicle. The controller is mounted on the circuit board, and is operable so as to control operation of the tire pressure monitoring device. The antenna is mounted on the circuit board, is operable so as to transmit the signal generated by the sensor, and includes a spiraling antenna section that lies on a plane parallel to the circuit board.

5 Claims, 9 Drawing Sheets

X – Z

X − Z

TIRE PRESSURE MONITORING DEVICE

CROSS-REFERENCE TO RELATED APPLICATION

This application claims priority of Taiwanese application no. 093215476, filed on Sep. 29, 2004.

BACKGROUND OF THE INVENTION

1. Field of the Invention

The invention relates to a tire pressure monitoring device, more particularly to a tire pressure monitoring device that includes a high gain antenna.

2. Description of the Related Art

FIG. 1 illustrates a conventional tire pressure monitoring device 9 that includes a circuit board 92, a sensor 94, a controller 93, and a helical antenna 91. The sensor 94, the controller 93, and the helical antenna 91 are mounted on the circuit board 92.

The aforementioned conventional tire pressure monitoring device 9 is disadvantageous in that the helical antenna 91 has a large size. Moreover, the controller 93 is disposed close to and is a source of interference for the helical antenna 91, thereby decreasing the antenna gain of the helical antenna 91.

From experimental results, when the helical antenna 91 of the conventional tire pressure monitoring device 9 is operated at a carrier frequency of 434 MHz, the helical antenna 91 achieves an average antenna gain of −17 dBi.

FIG. 2 illustrates measured three-dimensional radiation patterns 90 of the helical antenna 91 of the conventional tire pressure monitoring device 9.

FIG. 3 illustrates measured radiation patterns ($E_\theta$, $E_\phi$) in the x-z plane of the helical antenna 91 of the conventional tire pressure monitoring device 9.

FIG. 4 illustrates measured radiation patterns ($E_\theta$, $E_\phi$) in the y-z plane of the helical antenna 91 of the conventional tire pressure monitoring device 9.

FIG. 5 illustrates measured radiation patterns ($E_\theta$, $E_\phi$) in the x-y plane of the helical antenna 91 of the conventional tire pressure monitoring device 9.

SUMMARY OF THE INVENTION

Therefore, the object of the present invention is to provide a tire pressure monitoring device that includes a high gain antenna that has a relatively small size.

According to the present invention, a tire pressure monitoring device comprises a planar circuit board, a sensor, a controller, and an antenna. The sensor is mounted on the circuit board, is adapted for detecting a pressure of a pneumatic tire of a vehicle, and is operable so as to generate a signal that corresponds to the detected pressure of the pneumatic tire of the vehicle. The controller is mounted on the circuit board, and is operable so as to control operation of the tire pressure monitoring device. The antenna is mounted on the circuit board, and is operable so as to transmit the signal generated by the sensor. The antenna includes a spiraling antenna section that lies on a plane parallel to the circuit board.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
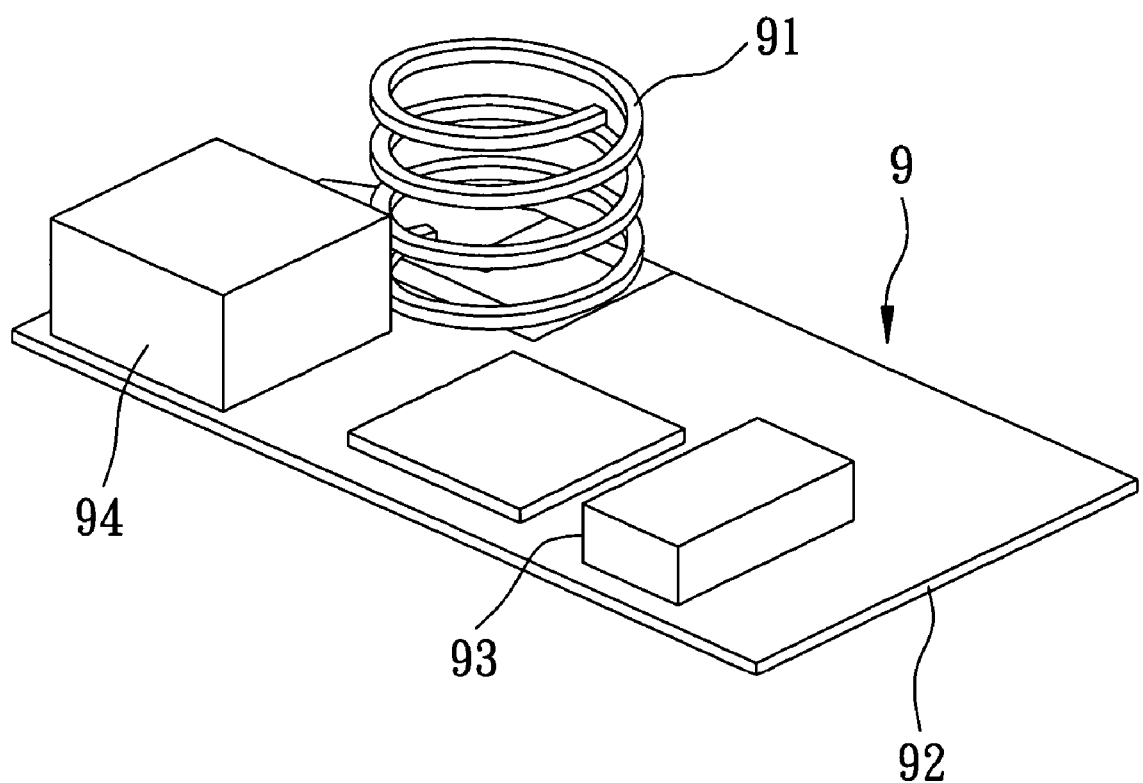
FIG. 1 is a perspective view of a conventional tire pressure monitoring device.
Figure 2:
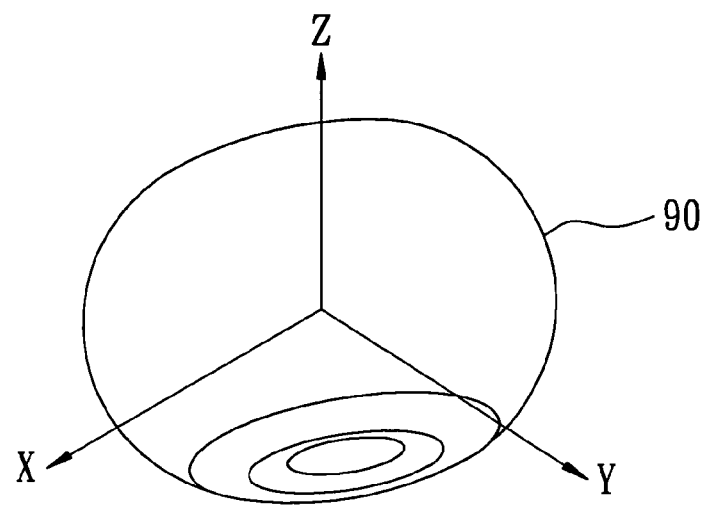
FIG. 2 is a graph illustrating three-dimensional radiation patterns of a helical antenna of the conventional tire pressure monitoring device.
Figure 3:
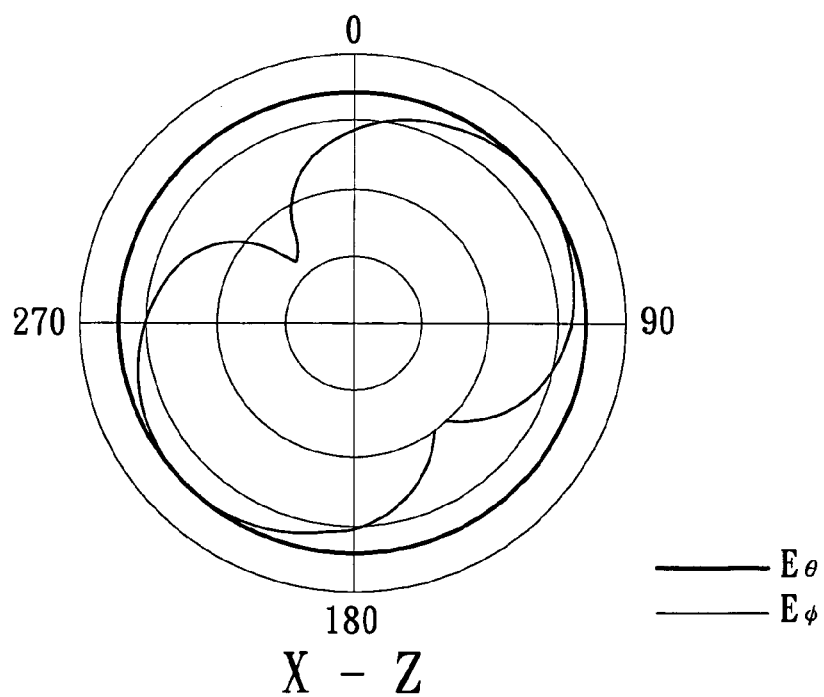
FIG. 3 is a graph illustrating radiation patterns of the helical antenna of the conventional tire pressure monitoring device in the x-z plane.
Figure 4:
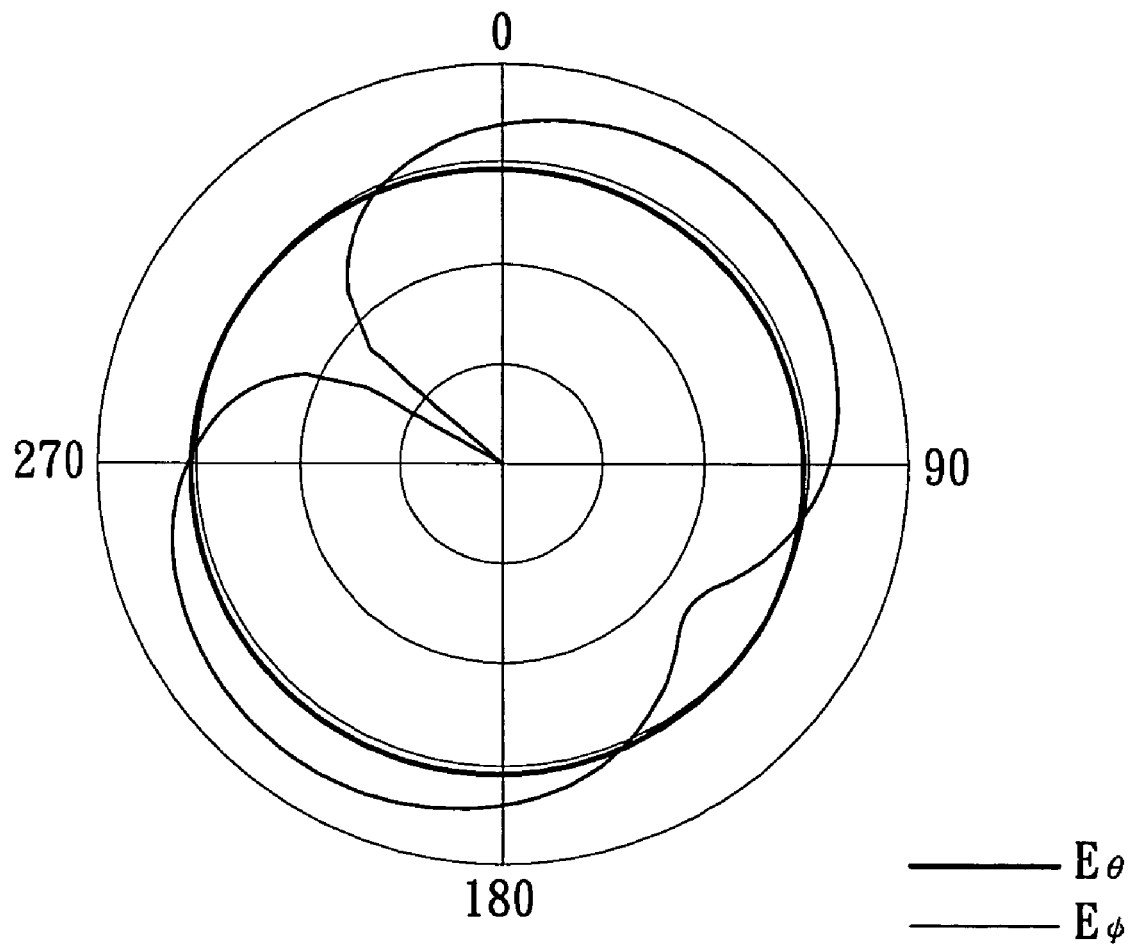
FIG. 4 is a graph illustrating radiation patterns of the helical antenna of the conventional tire pressure monitoring device in the y-z plane.
Figure 5:
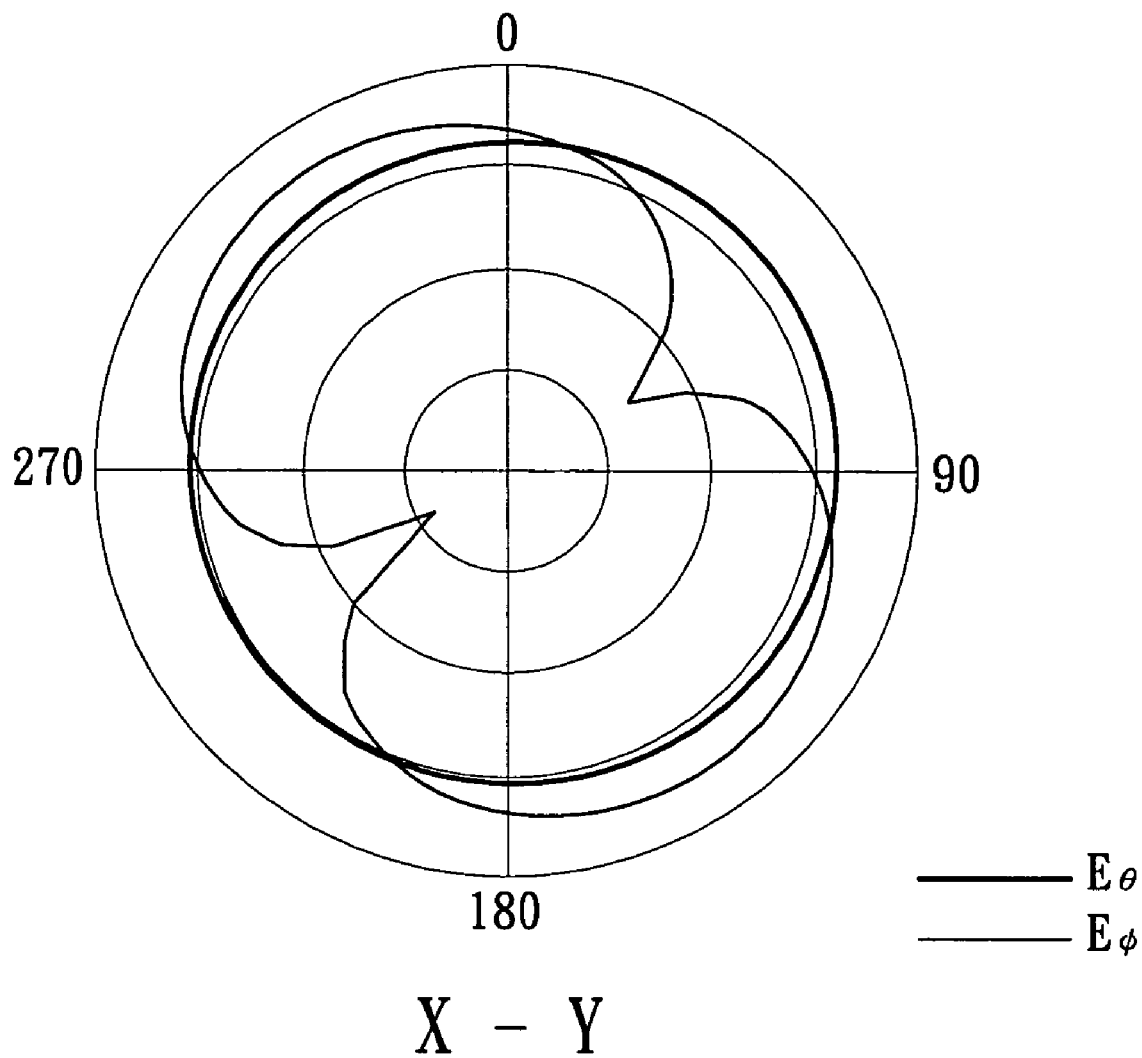
FIG. 5 is a graph illustrating radiation patterns of the helical antenna of the conventional tire pressure monitoring device in the x-y plane.
Figure 6:
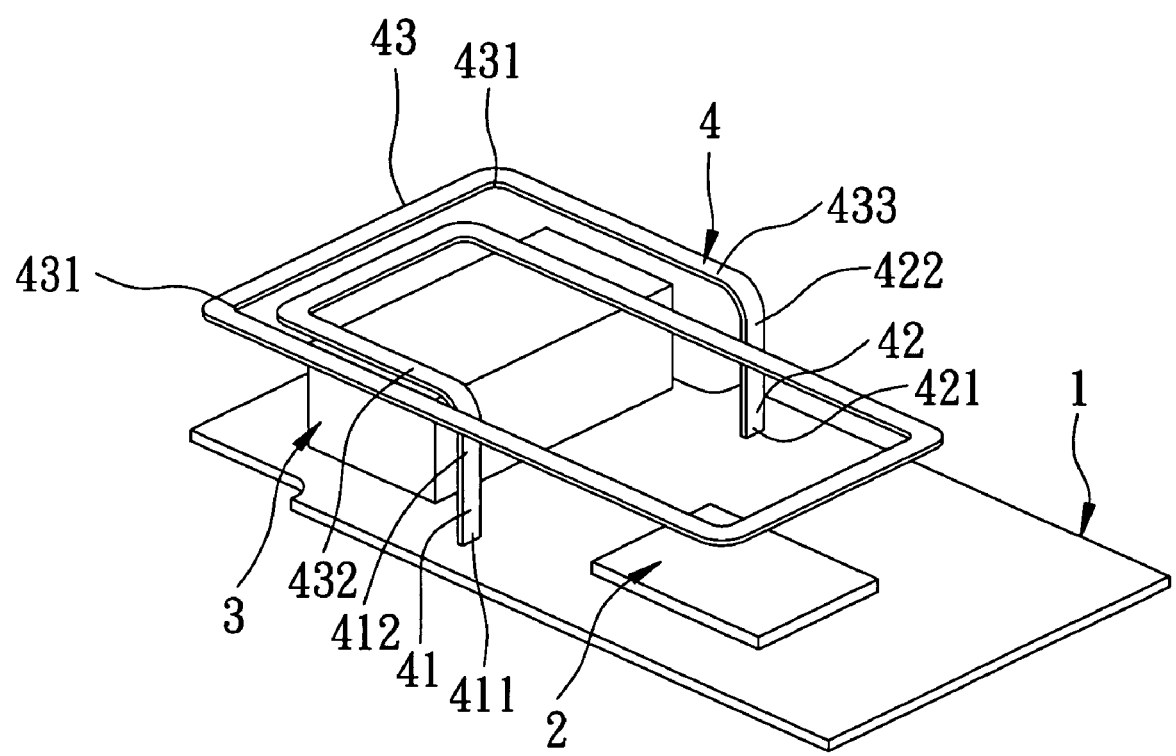
FIG. 6 is a perspective view of the preferred embodiment of a tire pressure monitoring device according to the present invention.
Figure 7:
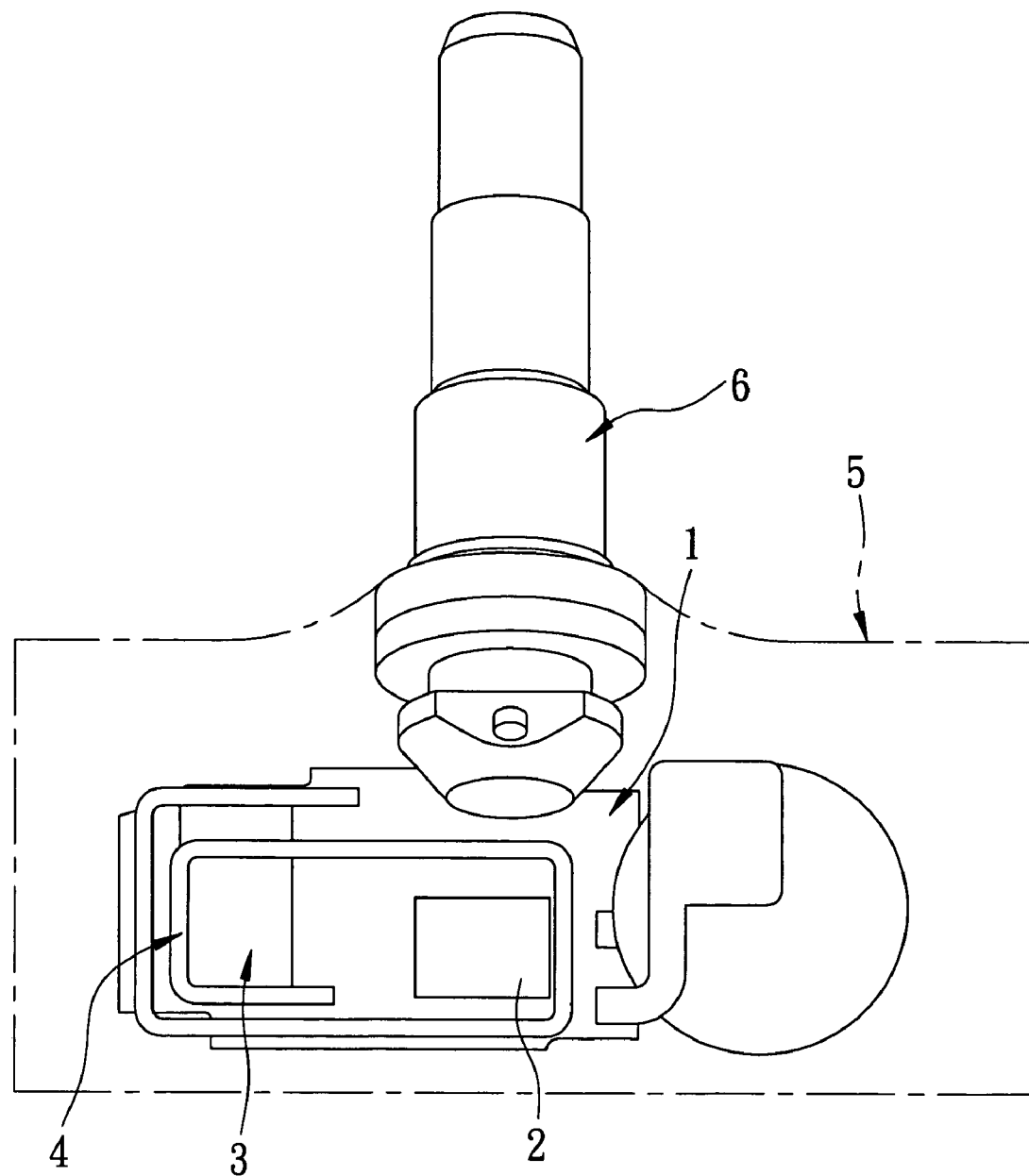
FIG. 7 is a schematic view of the preferred embodiment.

Referring to FIGS. 6 and 7, the preferred embodiment of a tire pressure monitoring device according to this invention is shown to include a planar circuit board 1, a sensor 3, a controller 2, and an antenna 4.

The sensor 3 is mounted on the circuit board 1, is adapted for detecting a pressure of a pneumatic tire (not shown) of a vehicle (not shown), and is operable so as to generate a signal that corresponds to the detected pressure of the pneumatic tire of the vehicle.

The controller 2 is mounted on the circuit board 1, and is operable so as to control operation of the tire pressure monitoring device of this invention.

The antenna 4 is mounted on the circuit board 1, and is operable so as to transmit the signal generated by the sensor 3. In this embodiment, the antenna 4 includes a spiraling antenna section 43 that lies on a plane parallel to the circuit board 1 and that includes a plurality of bends 431, each of which defines a generally right angle. As such, the loop area and the effective physical length of the spiraling antenna section 43 of the antenna 4 may be respectively enlarged and shortened so as to obtain a desired antenna gain at a given operating frequency.

It is noted that each of the bends 431 has a rounded corner. As such, the antenna 4 is prevented from generating noise interference when transmitting the signal generated by the sensor 3.

The antenna 4 further includes a pair of parallel first and second antenna support sections 41, 42 that serve to support the spiraling antenna section 43. In particular, the first antenna support section 41 has a first end portion 411 mounted on the circuit board 1, such as by soldering, and a second end portion 412 opposite to the first end portion 411 of the first antenna support section 41. Similarly, the second antenna support section 42 has a first end portion 421 mounted on the circuit board 1, such as by soldering, and a second end portion 422 opposite to the first end portion 421 of the second antenna support section 42. The spiraling antenna section 43 has inner and outer end portions 432, 433, each of which extends from the second end portion 412, 421 of a respective one of the first and second antenna support sections 41, 42.

In an alternative embodiment, only one of the first end portions 411, 412 of the first and second antenna support sections 41, 42 is mounted on the circuit board 1, and the other of the first end portions 411, 412 of the first and second antenna support section 41, 42 is disposed to abut against the circuit board 1.

It is noted that since the spiraling antenna section 43 of the antenna 4 is disposed above the circuit board 1, approximately 8 millimeters in this embodiment, via the first and second antenna support sections 41, 42 of the antenna 4, interference between the antenna 4 and the controller 2 is minimized, thereby increasing the antenna gain of the antenna 4.

The tire pressure monitoring device further includes a casing 5 that serves to house the circuit board 1, the sensor 3, the controller 2, and the antenna 4. In this embodiment, the casing 5 is formed by injection molding.

The tire pressure monitoring device further includes an air valve 6 that extends from the casing 5.

From experimental results, when the antenna 4 is operated at a center frequency of 434 MHz, the antenna 4 achieves maximum antenna gains of 6.66 dBi in the x-z plane, 7.14 dBi in the y-z plane, and 7.36 dBi in the x-y plane, which results in an average antenna gain of 7.36 dBi. Indeed, the antenna 4 of the tire pressure monitoring device of the present invention has a relatively high antenna gain.

Figure 8:
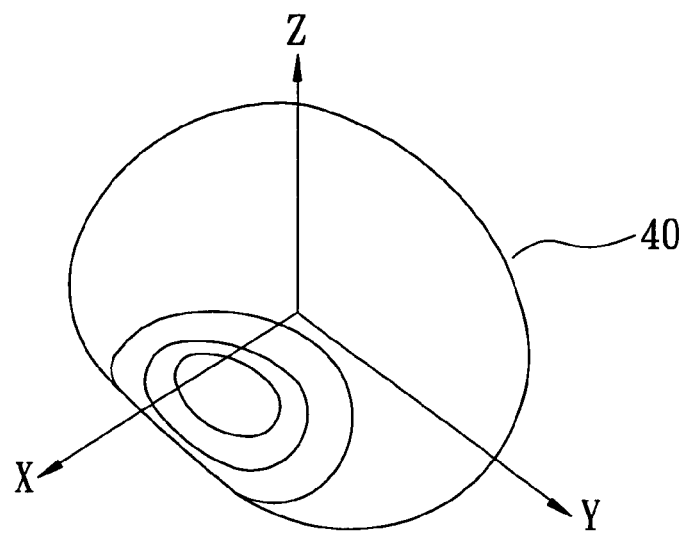
FIG. 8 is a graph illustrating three-dimensional radiation patterns of an antenna of the preferred embodiment.

FIG. 8 illustrates measured three-dimensional radiation patterns 40 of the antenna 4 of the tire pressure monitoring device of this invention.

Figure 9:
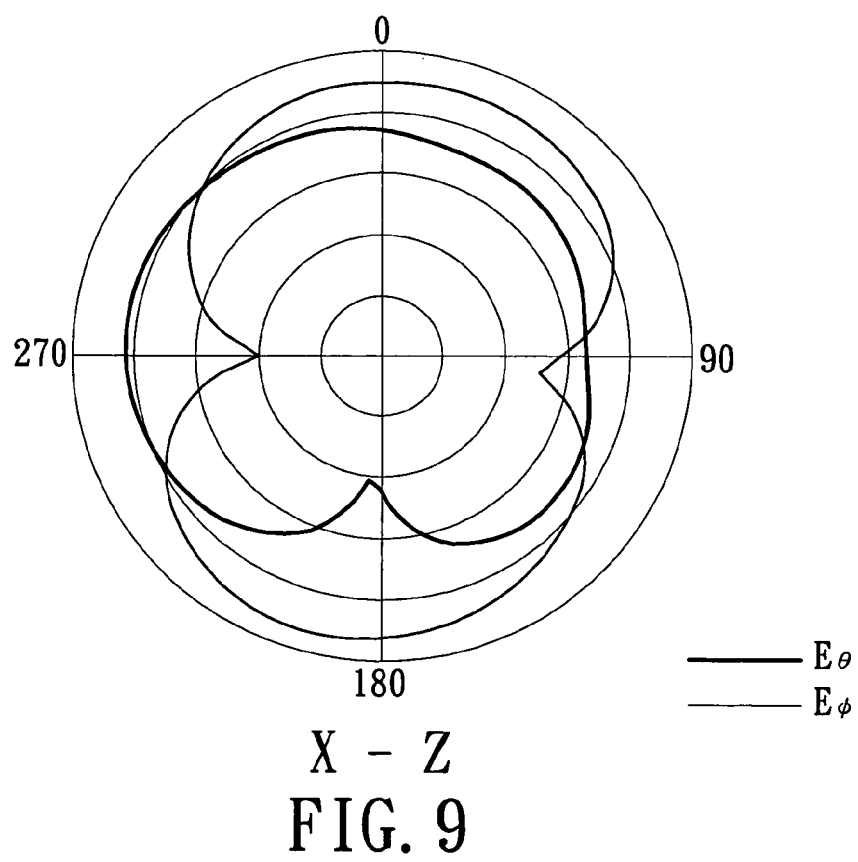
FIG. 9 is a graph illustrating radiation patterns of the antenna of the preferred embodiment in the x-z plane.

FIG. 9 illustrates measured radiation patterns ($E_\theta$, $E_\phi$) in the x-z plane of the antenna 4 of the tire pressure monitoring device of this invention.

Figure 10:
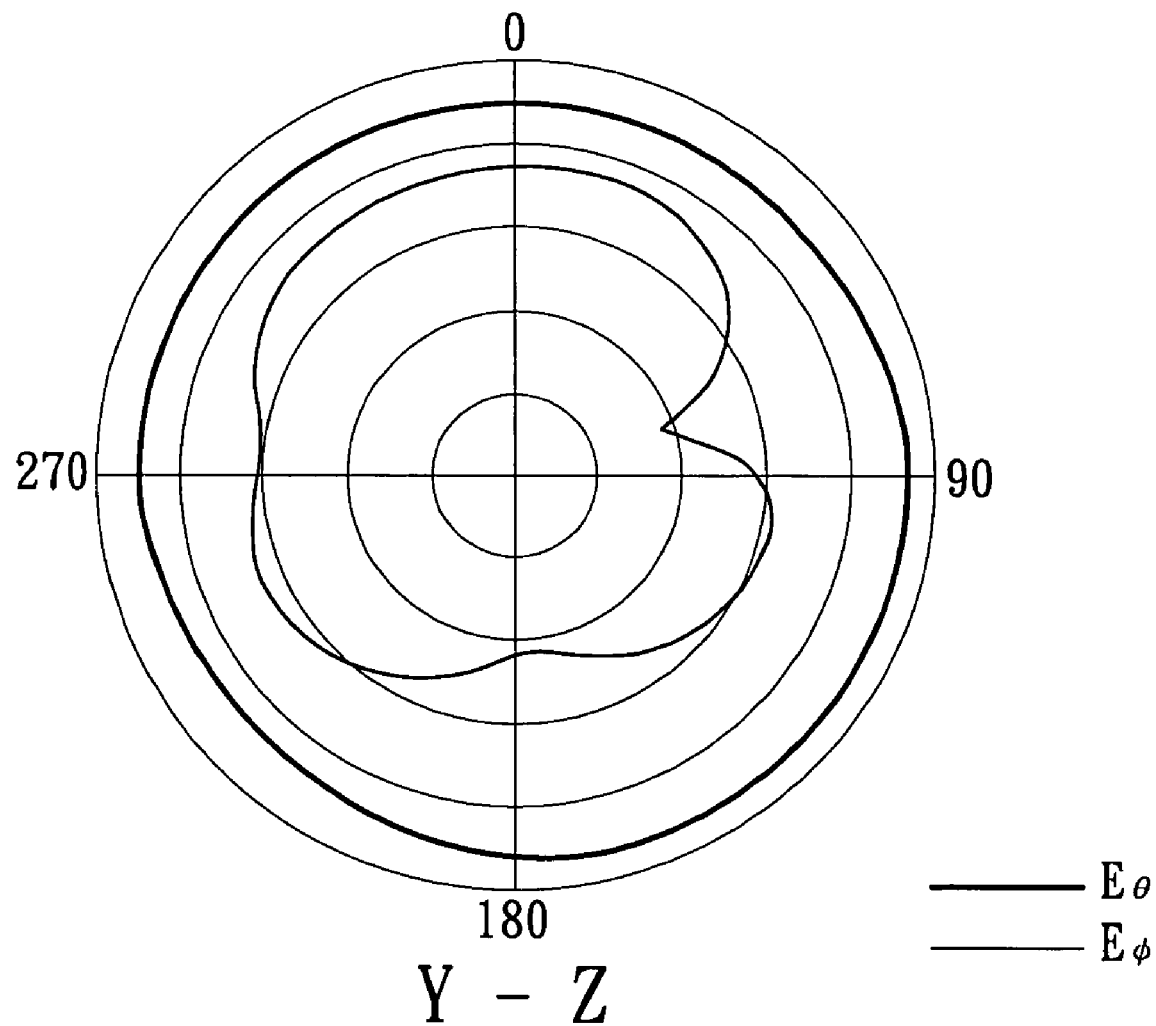
FIG. 10 is a graph illustrating radiation patterns of the antenna of the preferred embodiment in the y-z plane.

FIG. 10 illustrates measured radiation patterns ($E_\theta$, $E_\phi$) in the y-z plane of the antenna 4 of the tire pressure monitoring device of this invention.

Figure 11:
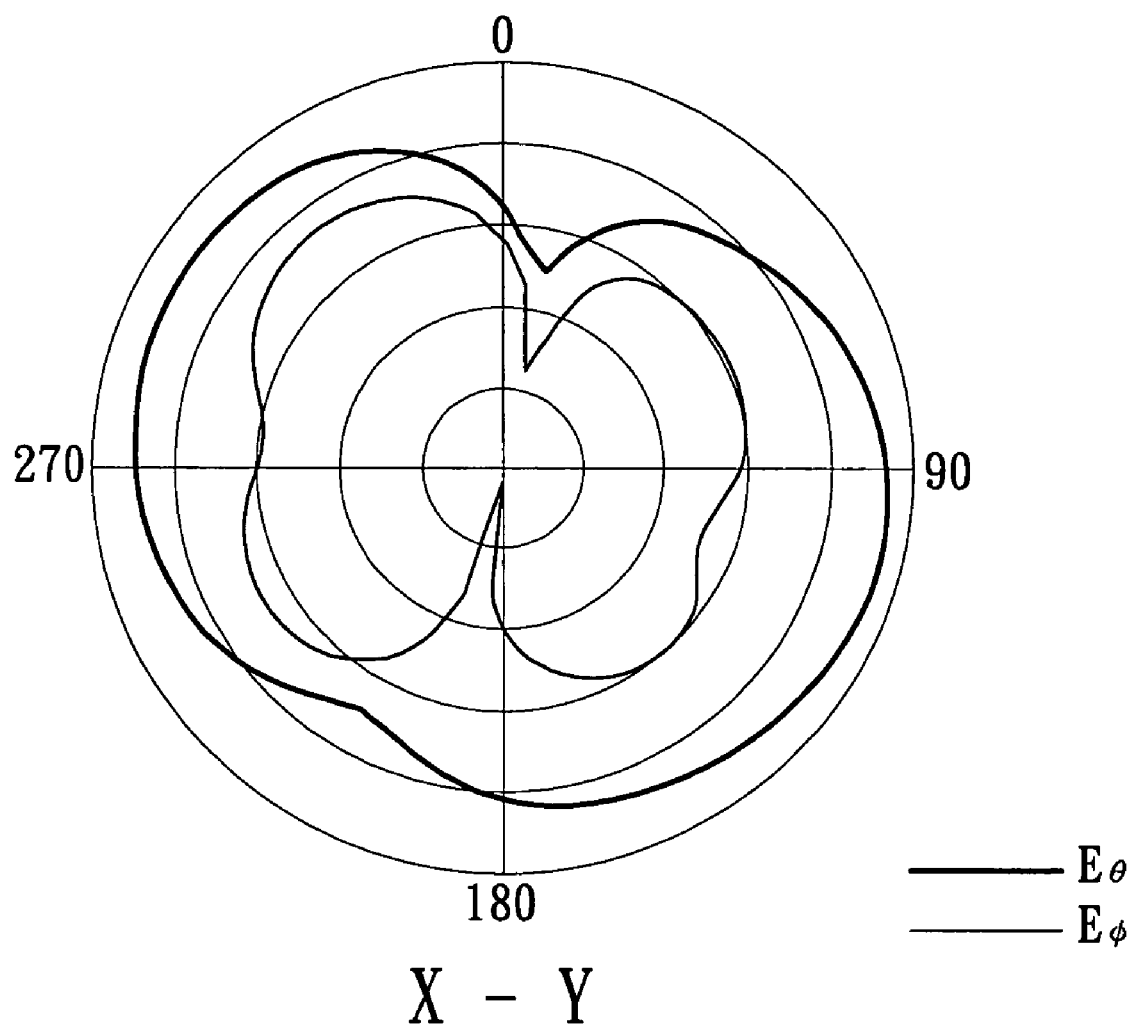
FIG. 11 is a graph illustrating radiation patterns of the antenna of the preferred embodiment in the x-y plane.

FIG. 11 illustrates measured radiation patterns ($E_\theta$, $E_\phi$) in the y-z plane of the antenna 4 of the tire pressure monitoring device of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A tire pressure monitoring device comprising: a planar circuit board;
   a sensor mounted on said circuit board, is adapted for detecting a pressure of a pneumatic tire of a vehicle, and operable so as to generate a signal that corresponds to the detected pressure of the pneumatic tire of the vehicle;
   a controller mounted on said circuit board, and operable so as to control operation of said tire pressure monitoring device;
   an antenna mounted on said circuit board, and operable so as to transmit the signal generated by said sensor, said antenna including a spiraling antenna section that lies on a plane parallel to said circuit board; and
   wherein said antenna further includes first and second antenna support sections for supporting said spiraling antenna section, each of said first and second antenna support sections having opposite first and second end portions, at least one of said first end portions of said first and second antenna support sections being mounted on said circuit board, said spiraling antenna section having inner and outer end portions, each of which extends from said second end portion of a respective one of said first and second antenna support sections.

2. The tire pressure monitoring device as claimed in claim 1, wherein said spiraling antenna section of said antenna has a plurality of bends, each of which defines a generally right angle.

3. The tire pressure monitoring device as claimed in claim 2, wherein each of said bends has a rounded corner.

4. A tire pressure monitoring device comprising:
   a planar circuit board;
   a sensor mounted on said circuit board, is adapted for detecting a pressure of a pneumatic tire of a vehicle, and operable so as to generate a signal that corresponds to the detected pressure of the pneumatic tire of the vehicle;
   a controller mounted on said circuit board, and operable so as to control operation of said tire pressure monitoring device;
   an antenna mounted on said circuit board, and operable so as to transmit the signal generated by said sensor at a carrier frequency of 434 MHz, said antenna including
   a spiraling antenna section that lies on a plane parallel to said circuit board, and that has a plurality of bends, each of which defines a generally right angle, and
   first and second antenna support section for supporting said spiraling antenna section, each of said first and second antenna support sections having opposite first and second end portions, at least one of said first end portions of each of said first and second antenna support section being mounted on said circuit board,
   said spiraling antenna section having inner and outer end portions, each of which extends from said second end portion of a respective one of said first and second antenna support sections.

5. The tire pressure monitoring device as claimed in claim 4, wherein each of said bends has a rounded corner.

* * * * *